US009077722B2

(12) United States Patent
Le Rouzic et al.

(10) Patent No.: US 9,077,722 B2
(45) Date of Patent: Jul. 7, 2015

(54) METHOD AND SYSTEM FOR CONTROLLING THE RESTART TRAFFIC IN A TELECOMMUNICATION NETWORK

(75) Inventors: Jean-Claude Le Rouzic, Trebeurden (FR); Stéphane Tuffin, Rospez (FR)

(73) Assignee: France Telecom, Paris (FR)

(*) Notice: Subject to any disclaimer, the term of this patent is extended or adjusted under 35 U.S.C. 154(b) by 778 days.

(21) Appl. No.: 13/143,728

(22) PCT Filed: Jan. 8, 2010

(86) PCT No.: PCT/FR2010/050025
§ 371 (c)(1),
(2), (4) Date: Jul. 7, 2011

(87) PCT Pub. No.: WO2010/079307
PCT Pub. Date: Jul. 15, 2010

(65) Prior Publication Data
US 2011/0273986 A1 Nov. 10, 2011

(30) Foreign Application Priority Data

Jan. 8, 2009 (FR) ...................... 09 50082

(51) Int. Cl.
*H04L 12/26* (2006.01)
*H04L 29/06* (2006.01)
*H04W 60/02* (2009.01)

(52) U.S. Cl.
CPC ........ *H04L 65/1016* (2013.01); *H04L 65/1069* (2013.01); *H04W 60/02* (2013.01); *H04L 65/1006* (2013.01); *H04L 65/1073* (2013.01)

(58) Field of Classification Search
CPC .... H04L 65/1016; H04L 65/105; H04L 69/40
USPC ................................... 370/216, 352
See application file for complete search history.

(56) References Cited

U.S. PATENT DOCUMENTS

| 2009/0097398 | A1* | 4/2009 | Belinchon Vergara et al. ............... 370/216 |
| 2010/0002582 | A1* | 1/2010 | Luft et al. ............... 370/230.1 |
| 2010/0027529 | A1* | 2/2010 | Jackson et al. ............... 370/352 |

OTHER PUBLICATIONS

D.J. Rosenberg Cisco Systems S:, "Session Timers in the Session Initiation Protocol (SIP); rfc4028.txt", IETF Standard, Internet Engineering Task Force, Apr. 1, 2005, XP015041971.
(Continued)

*Primary Examiner* — Mark Rinehart
*Assistant Examiner* — Matthew Hopkins
(74) *Attorney, Agent, or Firm* — Cozen O'Connor

(57) ABSTRACT

A method of regulating traffic in a telecommunications network, including the following steps: after the network receives an initial registration request, and if the network is capable of processing said initial registration request, it prescribes for the terminal that sent the request a registration refresh period randomly selected from a range defined by a predetermined minimum value ($PREI_{min}$) and a predetermined maximum value ($PREI_{max}$), and after the network receives a registration refresh request, it prescribes for the terminal that sent the request a registration refresh period equal to the value (PRE) provided for normal operation of the network.

12 Claims, 2 Drawing Sheets

(56) References Cited

OTHER PUBLICATIONS

A.S. Tanenbaum: "Computer networks", 2003 Pearson Education International, pp. 255-258.

Rosenberg Dynamicsoft J.:, "The Session Initiation Protocol (SIP) Update Method; rfc3311.txt", IETF Standard, Internet Engineering Task Force, IETF, Sep. 1, 2002, XP015009088.

* cited by examiner

METHOD AND SYSTEM FOR CONTROLLING THE RESTART TRAFFIC IN A TELECOMMUNICATION NETWORK

RELATED APPLICATIONS

This application is a U.S. National Phase Application under 35 USC 371 of International Application No. PCT/FR2010/050025, filed on Jan. 8, 2010.

This patent application claims the priority of the French patent application no. 09/50082 filed Jan. 8, 2009, the disclosure content of which is hereby incorporated by reference.

FIELD OF THE INVENTION

The present invention relates to the means provided in a telecommunications network to deal with a partial or complete fault of the network. It relates particularly (but not exclusively) to networks, for example Internet Protocol (IP) networks, able to use sophisticated session control protocols such as the H.323 protocol and the Session Initiation Protocol (SIP).

BACKGROUND OF THE INVENTION

IP networks enable broadcasting of conversational data (Voice Over IP, Content Sharing, Presence, Instant Messaging, etc.).

The designation H.323 covers a set of protocols for transmission of voice, image and data over IP, as explained in the on-line encyclopedia Wikipedia. These protocols were developed by the ITU-T. They can be grouped together into three categories: signaling, codec (coder-decoder) negotiation, and information transport.

The SIP is defined by the IETF in the document RFC 3261. This protocol makes it possible to set up, modify and terminate multimedia sessions in a network using the Internet Protocol. The SIP also allows event notification procedures and sending information outside the context of a session. It is widely used for instant messaging service commands. Thus in an SIP environment there exist different types of calls such as session set-up requests and requests exchanged outside of any dialogue.

These sophisticated session control protocols make use, in particular, of signaling messages, which are messages enabling a terminal to request a connection with another terminal, and messages signaling that a telephone line is busy, or that the called telephone is ringing, or that the telephone is connected to the network and may be contacted in such or such a manner.

The invention relates particularly (but not exclusively) to IP Multimedia Subsystem (IMS) infrastructures. The IMS is defined by the standards bodies 3GPP (3rd Generation Partnership Project) and TISPAN (Telecommunications and Internet Converged Services and Protocols for Advanced Networking). It is a network architecture introduced by the 3GPP for mobile networks, and then adopted by TISPAN for fixed networks. This architecture enables dynamic setting up and control of multimedia sessions between two clients and reservation of resources at the level of the multimedia stream transport network. It also manages the interaction of services. At present the IMS allows access to telephone, videophone, presence, and instant messaging services.

When a user wishes to obtain the benefit of services offered by an IP network such as those described above, they send network signaling messages that may in particular include various types of request.

First, the user terminals must register with the network. If the network is unable to link this registration and a previous registration (for example following a network fault or the terminal being switched off for longer than a predetermined expiration period), the registration is considered as being an initial registration. After an initial registration, the user terminals must periodically (for example every hour) send the network a request to confirm that they wish to maintain their registration; the time interval between two such requests is referred to as a registration refresh period.

Moreover, if the network uses the Session Initiation Protocol, user terminals may subscribe to services by sending a corresponding request. This service may be an event notification service: for example, if the user has a voicebox on the network, their terminal may subscribe to a message posting notification service, i.e. it may request to be informed each time that a message is placed in the voicebox; the user terminal may also request to be notified of its registration status. It may equally subscribe to a presence notification service enabling it to receive information published by another user that it has designated, and so on.

Following the initial subscription request, the terminal must periodically send the network a request to renew its subscription; the time interval between two such requests is referred to as the subscription refresh period.

The various states of the terminal-network system requiring periodic refreshing are commonly referred to as soft-states. The applicable standards require the terminals to manage timers enabling them to send these refresh requests (registration or subscription refresh) automatically.

When a user is registered on the network from a terminal (whether this refers to an initial registration or a refresh), the network informs the terminal of the registration refresh period required by the network operator. This registration refresh period indicated to the terminal is less than or equal to a core network level Expires (registration duration) parameter; the document RFC 3261 referred to above specifies an Expires parameter value equal to 3600 second(s).

After being initially registered, a terminal may, as explained above, subscribe to certain services (for example a message posting notification, presence notification or registration status notification service). The initial subscription requests are sent either automatically just after initial registration or following user action via the interface of the terminal. For each subscription (initial subscription or subscription refresh), the network informs the terminal of the refresh period required by the network operator for that subscription. In the document RFC 3265, the maximum subscription refresh period used by the core network is defined with reference to the event-package part of the document defining the subscription type; for subscribing to the message posting notification service, for example, the document RFC 3842 specifies a refresh period from a few hours to a few days (see under "event-package message summary").

In this context, during normal operation of the network, the network receives initial registration and initial subscription requests and also receives registration and subscription refresh requests as and when network users connect and then renew their registrations and their subscriptions after the provided respective refresh periods. The processing capacity of the nodes of the network is obviously intended to accommodate the corresponding request frequency, in particular as a function of the usual number of network users. In many circumstances, and in particular with so-called "always-on" networks and services, in normal operation, the reconnection rate, and thus the initial rate of registration and subscription, is particularly low. This situation is shown in FIG. 1a.

However, particular problems arise in this situation in the event of a partial or complete fault of the network.

When a fault occurs in the network, the terminals connected to the faulty node or link all attempt to effect an initial registration followed by one or more initial subscriptions. The rate at which terminals seek to effect initial registration depends on how they are programmed. For example, the LiveBox terminals from France Telecom are at present programmed to attempt to register every four minutes. Thus the terminals apply a time-out period that is usually between a few tens of seconds and a few minutes, and much shorter than the registration refresh period, which leads to an abnormally high rate of registration attempts. In other circumstances it is an action of the user via the interface of the terminal that triggers the registration attempt.

For a given terminal, the time for which the terminal must wait after a network fault before being registered again is therefore on average an increasing function of its time-out period. The expression "on average" refers to the fact that, for a given terminal, this time also depends on the moment at which the terminal attempts to register relative to the moment at which the fault clears. If by chance it attempts to register just after the fault clears, and assuming that the network is not overloaded, it is virtually certain that it will succeed in registering; in contrast, if it attempts to register just before the fault clears, it will have to wait the entire time-out period before attempting again to register.

Thus, in the prior art, on rebooting the network, the terminals send their respective registration requests slightly offset relative to one another. During a time of the order of the average time-out period, the network must therefore accommodate an abnormally high influx of requests, in proportion to the fault duration. Moreover, assuming that the network is capable of processing this reboot traffic, it must accommodate a new influx of requests coming from the same terminals at the end of the registration refresh period. This situation is shown in FIG. 1b.

However, the assumption to the effect that the network is capable of processing all signaling requests on a reboot often proves to be false in practice. As a function of its capacity (which may vary from one node to another), each node of the network processes the first requests that it receives; under such circumstances, the load on the nodes of the network increases rapidly until an overload is very often reached. Under these conditions, one or more nodes of the network (notably of the core network) no longer manage to satisfy all requests in time. To be more precise, for terminals for which the request has not been processed:

either these terminals receive a failure response from the network;

or these terminals receive no response in an allotted time ($64.T_1$, i.e. 32 seconds if $T_1=500$ milliseconds (ms) as in the document RFC 3261), and deduce from this that their registration request has failed.

These terminals then effect successive registration attempts separated from one another by said time-out period until they finally succeed in connecting or reconnecting (or give up trying).

Thus, following a fault in known telecommunications systems, there are seen both saturation of the network and a long waiting time before a plurality of terminals are able to connect or reconnect.

Various methods of managing faults in telecommunications networks are known.

For example, a proposal known in the art defines a time-out algorithm intended to be used by a terminal that has failed on an initial registration or registration refresh attempt. Using that algorithm, the waiting time observed by the terminal depends not only on the registration refresh period but also on the number of consecutive registration failures (to be more precise, the time-out period doubles each time that the terminal suffers another failed attempt to register, provided that the registration refresh period is not exceeded).

Known fault management methods are far from the optimum:

1) the duration of the time-out period is chosen by the terminal or by the user, instead of being indicated by the network; the terminals used to access services offered by a network operator are not necessarily programmed by the operator concerned, and the operator is therefore unable to program those terminals according to its requirements;

2) there is no provision for distinguishing between the different types of requests (registration, event notification subscription, presence notification subscription, and so on); consequently, the risk of congestion is evaluated as a function of all the requests that are usually sent after a reboot; for the network operator, satisfying subscription requests has a lower priority than enabling all users who so require to be able to register.

SUMMARY OF THE INVENTION

One aspect of the present invention is directed to a method of regulating traffic in a telecommunications network, including the following steps:

after the network receives an initial registration request, and if the network is capable of processing said initial registration request, it prescribes for the terminal that sent the request a registration refresh period randomly selected from a range defined by a predetermined minimum value and a predetermined maximum value; and after the network receives a registration refresh request, it prescribes for the terminal that sent the request, a registration refresh period equal to the value provided for normal operation of the network.

This achieves efficient spreading of registration refresh requests over the network, possibly following a fault, and this makes it possible to prevent refresh requests periodically causing traffic peaks compromising the processing capacity of the network. It should be noted that the mechanism of the invention has the advantage that it is independent of the programming of the terminals.

For example, said minimum value could be equal to said normal value and said maximum value equal to twice the normal value.

According to particular features:

after the network receives an initial subscription request of a certain type, and if the network is capable of processing said initial subscription request, it prescribes for the terminal that sent the request a subscription refresh period randomly selected from a range defined by a predetermined minimum value and a predetermined maximum value; and after the network receives a subscription refresh request, it prescribes for the terminal that sent the request a refresh period for a subscription of said type equal to the value provided for normal operation of the network.

By means of these features, subscription requests may also be spaced out to prevent congestion of the network following a fault. Spreading of the overall signaling traffic on rebooting is thus affected by subscription request traffic only to a degree that is adjustable by the network operator by adjusting the time intervals for the first refresh respectively for each subscription type (message posting notification, presence notification, registration status notification, etc.). This adjustment may in particular take account of the respective request traffic for each type of subscription in normal operation.

For example, said minimum value may be equal to said normal value for the type of subscription concerned and said maximum value may be equal to twice said normal value.

Another aspect of the invention is directed to a system for regulating traffic in a telecommunications network, including means for:

after the network receives an initial registration request, and if the network is capable of processing said initial registration request, prescribing for the terminal that sent the request a registration refresh period randomly selected from a range defined by a predetermined minimum value and a predetermined maximum value; and after the network receives a registration refresh request, prescribing for the terminal that sent the request a registration refresh period equal to the value provided for normal operation of the network.

According to particular features, said traffic regulation system further includes means for:

after the network receives an initial subscription request of a certain type, and if the network is capable of processing said initial subscription request, prescribing for the terminal that sent the request a registration refresh period randomly selected from a range defined by a predetermined minimum value and a predetermined maximum value; and after the network receives a subscription refresh request, prescribing for the terminal that sent the request a refresh period for a subscription of said type equal to the value provided for normal operation of the network.

For example, said minimum value may be equal to said normal value for the type of subscription under consideration, and said maximum value may be equal to twice said normal value.

The advantages offered by these traffic regulation systems are essentially the same as those offered by the correlated methods succinctly explained above.

In particular, if the infrastructure of said telecommunications network is of IMS type, said means are included in a "REGISTRAR" function.

It should be noted that it is possible to implement the traffic regulation system succinctly described above by means of software instructions and/or by means of electronic circuits.

Another aspect of the invention is directed to a telecommunications network node, for example a server-computer, forming part of a traffic regulation system as succinctly described above.

Another aspect of the invention is directed to a computer program downloadable from a communications network and/or stored on a computer-readable medium and/or adapted to be executed by a microprocessor. This computer program is noteworthy in that it includes instructions for executing the steps of any of the traffic regulation methods succinctly described above when it is executed on a computer.

The advantages offered by this node and this computer program are essentially the same as those offered by said methods.

BRIEF DESCRIPTION OF THE DRAWINGS

Other aspects and advantages of the invention become apparent on reading the following detailed description of particular embodiments of the invention, provided by way of non-limiting example. The description refers to the accompanying figures, in which.

DETAILED DESCRIPTION OF THE DRAWINGS

Figure 2:
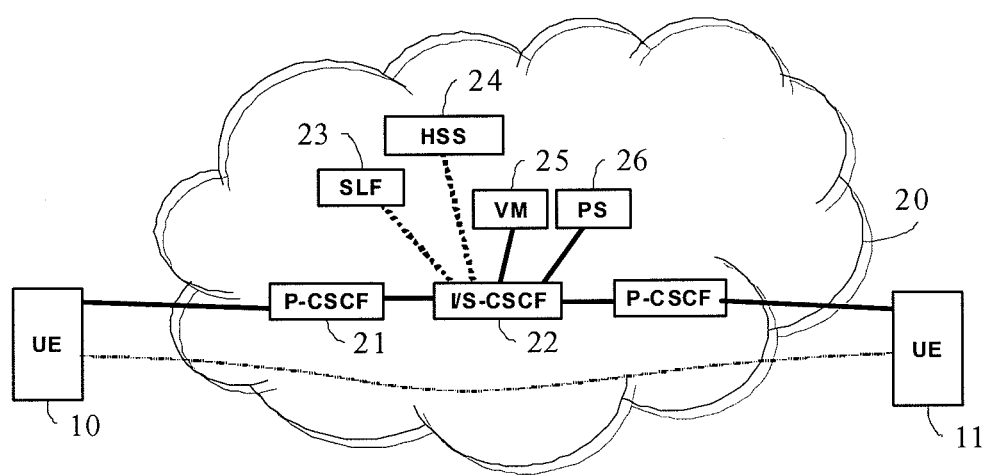
FIG. 2 represents diagrammatically a system for providing multimedia services adapted to use the invention.

The system shown in FIG. 2 is based on an IMS type network architecture, as succinctly presented above. The multimedia services offered by such a system may include telephony services, videotelephony services, content-sharing services, presence services, instant messaging services, or television services. These services are available to the user of a terminal (user equipment (UE)) 10 in a network 20 having an IP transport infrastructure and including IMS servers via which the terminal 10 is able to exchange SIP signaling messages and multimedia streams, in particular with another terminal (UE) 11, the terminals 10 and 11 being registered beforehand with the IMS servers of the network 20.

The terminals 10 and 11 are fixed or mobile terminals that have SIP signaling means and that may include means for reproducing an audiovisual content.

As FIG. 2 shows, this service provision system relies on a network 20 conforming to the IMS architecture defined by the 3GPP, including:

an IP transport infrastructure (not shown);

one or more I/S-CSCF routing servers combining an interrogating-call server control function and a serving-call server control function in the same server; an I/S-CSCF routing server 22 managing in particular the procedure for registering the terminal 10 in the network 20, routing signaling between the terminal 10 and the voicemail (VM) application server 25 and presence service (PS) application server 26 hosting the services to which the user of the terminal 10 subscribes, as well as routing to other terminals managed by the same IMS network, for example the terminal 11, and routing signaling between the IMS network 20 and other networks (not shown);

one or more proxy-call server control function (P-CSCF) servers; a P-CSCF server 21 is the SIP contact point of the terminal 10 in the IMS network; thus all SIP signaling exchanged between the terminal 10 and the I/S-CSCF routing server 22 managing the terminal 10 passes through this P-CSCF server 21;

one or more home subscriber server (HSS) type database servers; an HSS server 24 contains the profile of the user of the terminal 10 in terms of authentication, location, and subscribed services data;

optionally, a subscriber location function (SLF) server; an SLF server 23 is used in networks containing a plurality of HSS servers; this SLF server 23 is interrogated by the I-CSCF and S-CSCF functions to discover the address of the HSS server 24 hosting the data of the user of the terminal 10;

one or more voicemail (VM) application servers; a VM server 25 manages voicemail for the user of the terminal 10; in particular, the VM server 25 manages the subscription of the terminal 10 to the message posting/ reading events of the user of this terminal, and notifies the terminal 10 of the occurrence of these events; and one or more presence (PS) application servers; a PS server 26 manages in particular the subscription of the terminal 10 to the presence events that the user of this terminal wishes to monitor, and notifies the terminal of the occurrence of these events.

The HSS database server 24 is consulted in particular:

by the I-CSCF function on registration of the terminal 10 in order to allocate a I/S-CSCF server 22 to the user of this terminal or to discover the I/S-CSCF server 22 already allocated to this user;

by the S-CSCF function on initial registration of the user of the terminal 10 in order to download data concerning the services to which this user subscribes, including in particular the detection points that enable the I/S-CSCF server 22 to determine which signaling message it must route to which application server (for example the VM server 25 and the PS server 26);

by the S-CSCF function on registering the user of the terminal 10, in order to inform the HSS server 24 of the setting up or extension of this user's registration with the I/S-CSCF server 22; and by the S-CSCF function, in order to recover the information necessary to authenticate the signaling sent by the user of the terminal 10.

The terminal 10 must be registered in the network 20 for the user of the terminal to be able to use on that terminal the services provided by the network 20. The procedure for initial registration of the terminal 10 with the network 20 is normally executed when starting the terminal (or an application installed on the terminal) by the user. A registration has a validity time that is time-limited. Under normal operating conditions, the terminal 10 must renew its registration automatically and periodically. As mentioned above, the registration maintaining requests are referred to as "registration refresh" requests. In the SIP context, registration procedures use an "SIP REGISTER" request.

Some services, such as those of the VM server 25 and the PS server 26, rely on the terminal 10 subscribing to events (for example message posting/reading or presence events). The procedure for initially subscribing the terminal 10 to the network 20 is normally executed when starting up the terminal (or an application installed on the terminal) by the user, just after the initial registration procedure. An initial subscription procedure is executed for each type of event subscribed to (for example initial subscription to message posting/reading events is independent of initial subscription to presence events). A subscription has a time-limited duration. This duration may be different for each type of event subscribed to, and is also independent of the registration duration. Under normal operating conditions, the terminal 10 must renew its subscription or subscriptions to events automatically and periodically. As mentioned above, these requests for maintaining event subscriptions are referred to as "subscription refresh requests". In the SIP context, event subscription procedures use an "SIP SUBSCRIBE" request.

Different types of fault may render unavailable the services provided by the network 20 to the user of the terminal 10. In particular:

faults of type "A" the consequence of which is loss of data associated with the registration of the terminal 10 with the P-CSCF server 21, the I/S-CSCF server 22, or the HSS server 24;

faults of type "B" the consequence of which is blocking transmission of signaling between the terminal 10 and the P-CSCF server 21 or between the P-CSCF server 21 and the I/S-CSCF server 22 or between the I/S-CSCF server 22 and the SLF server 23 or between the I/S-CSCF server 22 and the HSS server 24 (this essentially concerns the IP transport infrastructure of the network 20).

For faults of type "A" or type "B", a terminal 10 attempts to refresh its registration during the fault if the duration of the fault is greater than or equal to the registration refresh period of the terminal 10; moreover, for fault durations shorter than the registration refresh period, the probability of a terminal attempting to refresh its registration during the fault is given by the fault duration divided by the registration refresh period (this assumes a regular distribution of the terminals during the registration refresh period).

In the above-mentioned situations, and in the situation of an initial registration failure caused by a network fault, the terminal 10 attempts to register with the network 20 until registration succeeds. As explained above, and to this end, the terminal 10 conventionally employs an algorithm prescribing a time-out period that the terminal must observe before attempting to register again, this time-out period having a duration less than or equal to the registration refresh period.

Clearly, for a given fault duration, the magnitude of the signaling traffic that a network node affected by the fault must process at the moment the fault is repaired is a decreasing function of said time-out period.

As already mentioned above, known algorithms used in terminals after a registration failure have the following disadvantages.

If the operator of the network 20 is not in complete control of these algorithms (for example in the situation of terminals purchased "off the shelf" by users or terminals where software updates are not monitored by the operator), the operator is not in a position to optimize the dimensioning of the nodes of their network and cannot enter into any undertaking as to the level of availability of the services rendered to users by the network 20.

A second drawback is that no means are provided for dissociating sending by terminals of an initial "SIP REGISTER" request from sending an initial "SIP SUBSCRIBE" request (usually following on from an initial "SIP REGISTER" request), including when this initial "SIP REGISTER" request follows a succession of unsuccessful registration attempts.

The present invention relates to initial registration requests processed by the network. After a fault clears it may happen that the network is saturated for a time and therefore incapable of processing in time some registration requests received during this reboot period; terminals for which the request has not been processed then wait a preprogrammed time-out period before again attempting to register, as in the prior art.

In the present embodiment of the invention, after reception by the network of an initial registration request that it is capable of processing, the "REGISTRAR" function of the I/S-CSCF server 22 calculates for the registration refresh period a random value from a range defined by a minimum value $PREI_{min}$ and a maximum value $PREI_{max}$, and the I/S-CSCF server 22 advises the sending terminal of this period.

When the terminal then sends a registration refresh request before expiry of this registration refresh period that has been notified to it, the network responds to that request by prescribing for the terminal a registration refresh period PRE equal to the value for normal operation of the network.

When a fault has cleared, initial registration requests processed by the network may come from:

terminals that connected just after the fault (and have therefore suffered no effects of the fault); or terminals that were connected before the fault, and whose registration has been lost because of the fault; or terminals that were connected before the fault and whose registration has not been lost in the core network (in the example considered here the core network is represented by the I/S-CSCF server 22), but that have sent a message (any message) that, because of the fault, has not been forwarded to the core network by a network access equipment (in the example considered here, the network access equipment is the P-CSCF server 21); in this situation, such a terminal concludes (wrongly) that it is no longer registered and sends an initial registration request before it would normally send a registration refresh request.

In the above-mentioned three situations, the network detects a new sequence of registrations (terminal not previously registered, or terminal registered but sending a request in which the initial registration identifier, usually referred to as the call-ID, is different from the latest stored call-ID).

Figure 1A:
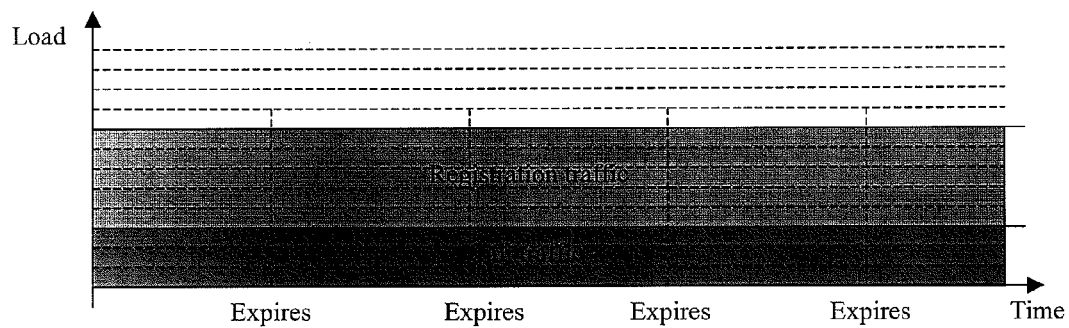
FIG. 1a, already described, is a graph representing diagrammatically the load on a telecommunications network in normal operation.
Figure 1B:
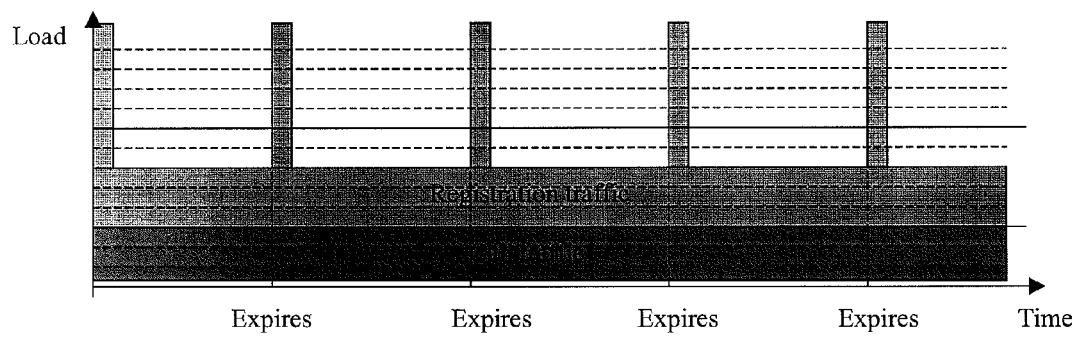
FIG. 1b, already described, is a graph representing diagrammatically the load on a prior-art network during rebooting of traffic following a fault.
Figure 1C:
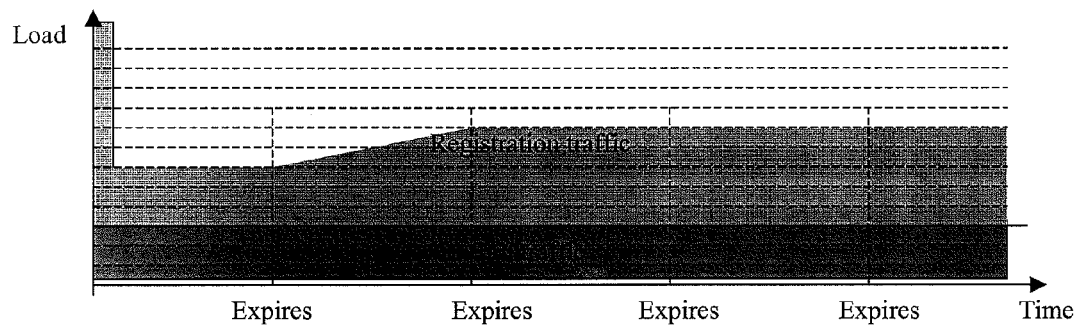
FIG. 1c is a graph representing diagrammatically the load on the network during rebooting of traffic following a fault in accordance with one embodiment of the present invention.

As shown in FIG. 1c, by means of the invention the registration refresh requests are spread out because, for each terminal registered after the fault clears (time t=0), the first refresh occurs at a random time in the range between $t=PREI_{min}$ and $t=PREI_{max}$ and subsequent refreshes occur at times later than the respective first refresh by a multiple of PRE. In this FIG. 1c, by way of example, $PREI_{min}=PRE$ and $PREI_{max}=2 \cdot PRE$, where PRE is equal to the Expires parameter referred to above.

An analogous method may optionally be applied to any type of subscription available (or optionally of a plurality of approved types). In other words, for a particular subscription type and for a respective terminal, the first subscription refresh occurs at a random time in the range between $t=PRSI_{min}$ and $t=PRSI_{max}$, and subsequent refreshes occur at times later than the respective first refresh by a multiple of PRS; here, PRS is the refresh period for this type of subscription during normal operation of the network. For example, $PRSI_{min}=PRS$ and $PRSI_{max}=2 \cdot PRS$.

Where implementation of the invention is concerned, the following two variants may be envisaged.

The first variant of the method of the invention functions continuously (should a fault occur). This variant of the method of the invention is therefore applied in particular to all initial registrations.

The second variant of the method of the invention operates for only a predetermined time after a fault clears. This predetermined time could for example be made equal to the larger value in the set of maximum values $PREI_{max}$ and $PRSI_{max}$ for the various types of subscription available. After expiry of this predetermined duration, the network immediately prescribes for terminals sending an initial registration request a registration refresh period equal to the normal value PRE.

In this respect, it should be noted that there exist in the prior art various ways to enable a node to detect a fault affecting another node of the network. Such means may for example rely on detecting the absence of reception of signaling messages exchanged between the two nodes during a certain period of time. To effect such detection, it is notably possible to rely on signaling messages sent by the terminals and normally forwarded by the nodes, or on signaling messages exchanged only between two nodes, or a combination of these two methods. For its part, detecting clearing of the fault relies on receiving signaling messages coming from the node previously considered as being faulty.

The invention may be implemented by means of software and/or hardware components in nodes of the telecommunications network (to be more precise, the P-CSCF and I/S-CSCF servers in the embodiment described above).

The software components could be integrated into a conventional network node management computer program. This is why, as indicated above, the present invention also provides a data processing system. That data processing system conventionally includes a central processor unit controlling a memory by means of signals, as well as an input unit and an output unit. Moreover, this data processing system may be used to execute a computer program including instructions for executing the traffic regulation method of the invention.

The invention also provides a computer program downloadable from a communications network including instructions for executing steps of a traffic regulation method of the invention when it is executed on a computer. This computer program may be stored on a computer-readable medium and adapted to be executed by a microprocessor.

This program may use any programming language and take the form of source code, object code, or a code intermediate between source code and object code, such as a partially-compiled form, or any other desirable form.

The invention also provides a computer-readable information medium containing instructions of a computer program as referred to above.

The information medium may be any entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed via an electrical or optical cable, by radio or by other means. The program of the invention may in particular be downloaded over an Internet type network.

Alternatively, the information medium may be an integrated circuit in which the program is incorporated, the circuit being adapted to execute the traffic regulation method of the invention or to be used in its execution.

The invention claimed is:

1. A method of regulating traffic in a telecommunications network for a plurality of terminals, comprising the steps of:

receiving, at a core of the telecommunications network, a registration request from one of the plurality of terminals;

if the telecommunications network successfully processes said registration request but is unable to link it with a previous registration request, said received registration request is considered to be an initial registration request, and the telecommunications network sets for said one terminal that sent said initial registration request a registration refresh period randomly selected from a range defined by a predetermined minimum value and a predetermined maximum value, wherein the registration refresh period specifies a time period between the successfully-processed initial registration request and a subsequent registration request received from said one terminal;

receiving, at the core of the telecommunications network, the subsequent registration request from said one terminal that sent said initial registration request; and if the telecommunications network successfully processes said subsequent registration request and is able to link it with said initial registration request, said received subsequent registration request is considered to be a registration refresh request, and the telecommunications network sets for said one terminal that sent said initial registration request and said registration refresh request, a registration refresh period equal to a predetermined value provided for normal operation of the telecommunications network.

2. The traffic regulation method according to claim 1, wherein said minimum value is equal to said normal value and said maximum value is equal to twice said normal value.

3. The traffic regulation method according to claim 1, further comprising the steps of:
   after the telecommunications network receives an initial subscription request of a certain type from one of the plurality of terminals, and if the telecommunications network is capable of processing said initial subscription request, the telecommunications network prescribes for said one terminal that sent said initial subscription request a subscription refresh period randomly selected from a range defined by a predetermined minimum value and a predetermined maximum value; and
   after the telecommunications network receives a subscription refresh request from said one terminal that sent said initial subscription request, the telecommunications network prescribes for said one terminal that sent said initial subscription request a refresh period for a subscription of said certain type equal to a value provided for normal operation of the telecommunications network.

4. The traffic regulation method according to claim 3, wherein said minimum value is equal to said normal value and said maximum value is equal to twice said normal value.

5. The traffic regulation method according to claim 1, wherein a terminal attempts to refresh its registration during a fault if the duration of the fault is greater than or equal to the registration refresh period of the terminal.

6. A system for regulating traffic in a telecommunications network for a plurality of terminals, comprising:
   means for calculating, for one of the plurality of terminals that sent a registration request, a registration refresh period randomly selected from a range defined by a predetermined minimum value and a predetermined maximum value after the telecommunications network receives said registration request from said one terminal, wherein the registration refresh period specifies a time period between the successfully-processed initial registration request and a subsequent registration request received from said one terminal, and if the telecommunications network successfully processes said received registration request but is unable to link it with a previous registration request, said received registration request is considered to be an initial registration request; and
   means for advising, for said one terminal that sent said initial registration request and the subsequent registration request, a registration refresh period equal to a predetermined value provided for normal operation of the telecommunications network after the telecommunications network receives the subsequent registration refresh from said one terminal that sent said initial registration request, wherein if the telecommunications network successfully processes said subsequent registration request and is able to link it with said initial registration request, said received subsequent registration request is considered to be a registration refresh request.

7. The traffic regulation system according to claim 6, wherein said minimum value is equal to said normal value and said maximum value is equal to twice said normal value.

8. The traffic regulation system according to claim 6, further comprising:
   means for prescribing for one of the plurality of terminals that sent an initial subscription request of a certain type a registration refresh period randomly selected from a range defined by a predetermined minimal value and a predetermined maximum value after the telecommunications network receives said initial subscription request of a certain type from said one of the plurality of terminals and if the telecommunications network is capable of processing said initial subscription request of a certain type; and
   means for prescribing for said one terminal that sent said initial subscription request of a certain type a refresh period for a subscription of said certain type equal to a value provided for normal operation of the network after the telecommunications network receives a subscription refresh request of a certain type from said one terminal that sent said initial subscription request of a certain type.

9. The traffic regulation system according to claim 8, wherein if said minimum value is equal to said normal value said maximum value is equal to twice said normal value.

10. The traffic regulation system according to claim 6, wherein the infrastructure of the telecommunications network is of IP Multimedia Subsystem (IMS) type and said means are included in a "REGISTRAR" function.

11. Non-removable, partially removable or totally removable non-transitory data storage means containing electronic data processing program code instructions for executing the steps of a traffic control method for a plurality of terminals, the method steps comprising:
   receiving, at a core of the telecommunications network, a registration request from one of the plurality of terminals;
   if the telecommunications network successfully processes said registration request but is unable to link it with a previous registration request, said received registration request is considered to be an initial registration request, and the telecommunications network sets for said one terminal that sent said initial registration request a registration refresh period randomly selected from a range defined by a predetermined minimum value and a predetermined maximum value, wherein the registration refresh period specifies a time period between the successfully-processed initial registration request and a subsequent registration request received from said one terminal;
   receiving, at the core of the telecommunications network, the subsequent registration request from said one terminal that sent said initial registration request; and
   if the telecommunications network successfully processes said subsequent registration request and is able to link it with said initial registration request, said received subsequent registration request is considered to be a registration refresh request, and the telecommunications network sets for said one terminal that sent said initial registration request and said registration refresh request, a registration refresh period equal to a predetermined value provided for normal operation of the telecommunications network.

12. A computer program product comprising a computer usable, non-transitory medium having a computer readable program code embedded therein, the computer readable program code including instructions for executing the steps of a traffic regulation method, wherein the method steps comprise:

receiving, at a core of the telecommunications network, a registration request from one of the plurality of terminals;

if the telecommunications network successfully processes said registration request but is unable to link it with a previous registration request, said received registration request is considered to be an initial registration request, and the telecommunications network sets for said one terminal that sent said initial registration request a registration refresh period randomly selected from a range defined by a predetermined minimum value and a predetermined maximum value, wherein the registration refresh period specifies a time period between the successfully-processed initial registration request and a subsequent registration request received from said one terminal;

receiving, at the core of the telecommunications network, the subsequent registration request from said one terminal that sent said initial registration request; and if the telecommunications network successfully processes said subsequent registration request and is able to link it with said initial registration request, said received subsequent registration request is considered to be a registration refresh request, and the telecommunications network sets for said one terminal that sent said initial registration request and said registration refresh request, a registration refresh period equal to a predetermined value provided for normal operation of the telecommunications network.

* * * * *